UNITED STATES PATENT OFFICE.

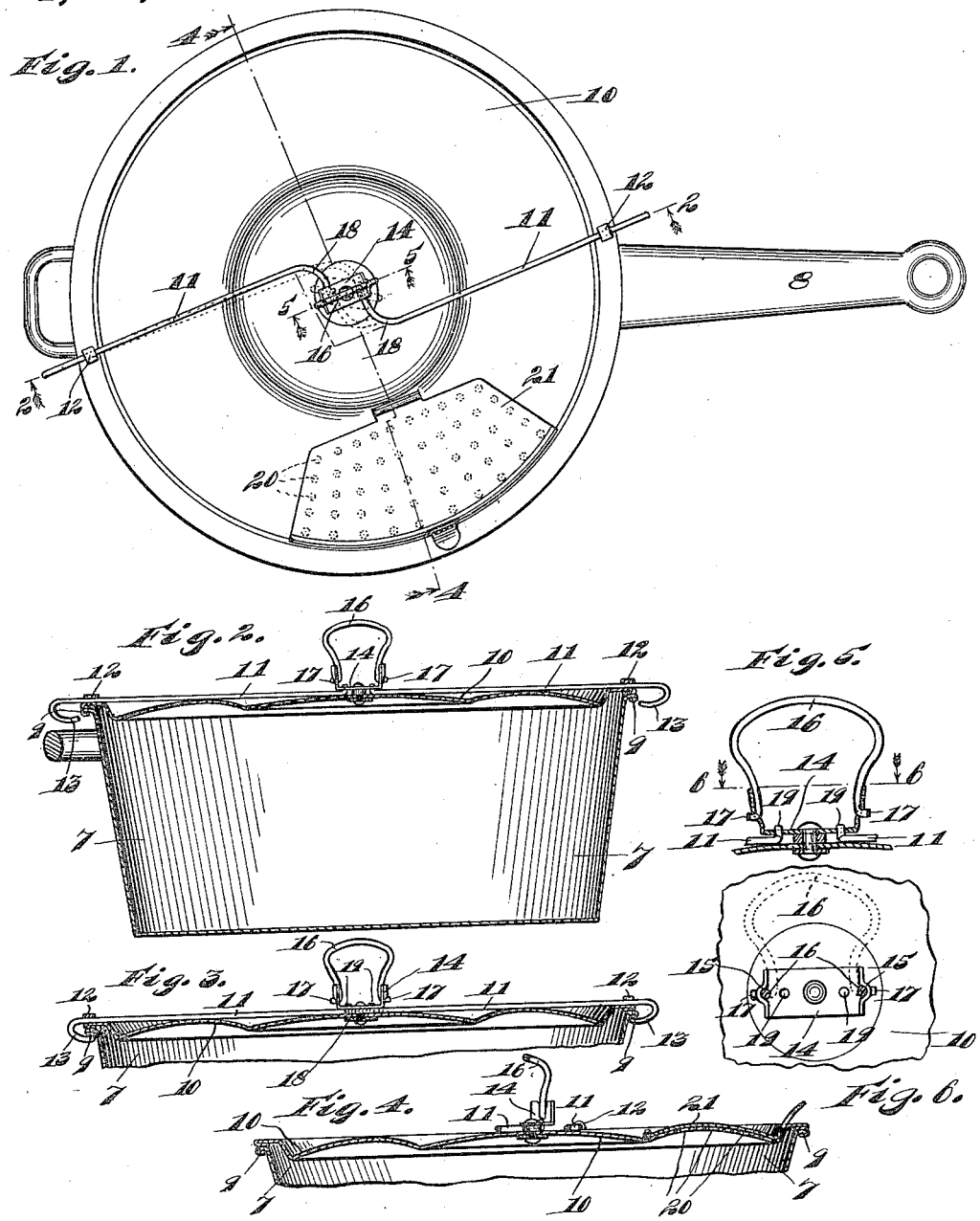

HERMAN A. PAQUETTE, OF CHICAGO, ILLINOIS, ASSIGNOR TO H. A. P. COOKING UTENSIL MFG. CO., OF CHICAGO, ILLINOIS, A CORPORATION OF ILLINOIS.

COOKING UTENSIL.

1,142,052.          Specification of Letters Patent.          Patented June 8, 1915.

Application filed July 30, 1914. Serial No. 854,027.

*To all whom it may concern:*

Be it known that I, HERMAN A. PAQUETTE, a citizen of the United States, and a resident of the city of Chicago, county of Cook, and State of Illinois, have invented certain new and useful Improvements in Cooking Utensils, of which the following is a specification.

My invention relates to improvements in cooking utensils, and has for its object the provision of an improved cooking utensil adapted to greatly facilitate the cooking operations such as boiling.

The invention consists in the combinations and arrangements of parts hereinafter described and claimed.

The invention will be best understood by reference to the accompanying drawing forming a part of this specification, and in which, Figure 1 is a top plan view of a utensil embodying my invention, Fig. 2, a transverse section of the same taken on substantially line 2—2 of Fig. 1, Fig. 3, a section through the top of the cooking utensil similar to Fig. 2 but showing the cover of the utensil locked in position thereon, Fig. 4, a section taken on substantially line 4—4 of Fig. 1, Fig. 5, an enlarged detail section on substantially line 5—5 of Fig. 1 and Fig. 6, a section taken on line 6—6 of Fig. 5.

The preferred form of construction as illustrated in the drawing comprises an ordinary cooking utensil 7 having the usual handle 8 and an outwardly extending lip 9 around its upper edge. The utensil 7 is provided with a cover 10 of any usual or desired form, and substantially radiating rods 11 are slidably mounted on said cover to slide substantially radially through guides 12 located near the outer edge of said cover. Each of the rods 11 is provided at its outer end with a downwardly and inwardly extending hook 13 adapted to engage under the lip 9 to retain the cover securely in position on the utensil. A substantially U-shaped plate 14 is pivotally mounted at the center of cover 10 and each of the limbs of said plate is provided near its bottom with a perforation and with a vertical groove 15 leading upwardly from said perforation. A spring wire handle member 16, substantially U-shaped in form, is provided at the end of each of its limbs with an outwardly turned end 17 projecting through the corresponding perforation in plate 14 to constitute a foldable handle for said plate, the limbs of said handle member normally resting in grooves 15, as indicated in Figs. 5 and 6. The inner end of each of the rods 11 is provided with an angularly turned end 18 having an upwardly turned projection 19 at its extremity pivotally engaging diametrically disposed openings in plate 14, as shown.

The arrangement is such, that when plate 14 is turned to the position shown in Fig. 1, the rods 11 will be extended radially to withdraw hooks 13 from engagement with lip 9. When it is desired to engage hooks 13 with lip 9 to retain the cover in position, the plate 14 is rotated clock-hand-wise through an angle of one hundred and eighty degrees whereupon hooks 13 will be drawn into engagement with lip 9 to lock the cover securely in position. The points of connection are so located that such rotation of plate 14 carries the pivotal projections 19 beyond the lines passing through the axis of the pivot of plate 14 and the corresponding guide 12 so that the parts are automatically locked in position. At one side cover 10 is provided with a plurality of strainer openings 20 located adjacent the edge thereof and an upwardly swinging cover 21 is provided for such openings.

In use, articles to be cooked are placed in utensils 7 with sufficient water for the purpose, and the cover locked in position thereon. During the cooking the excess of steam generated may escape through straining openings 20 by slightly raising cover 21, and when the articles in the utensil are cooked, the excess water may be readily poured therefrom by simply tilting the utensil toward the draining openings 20 without danger of spilling the articles.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with a cooking utensil having an outwardly extending lip around its top, of a cover therefor; two substantially radiating rods slidably secured to said cover and provided at their outer ends with hooks adapted to engage said lip; a rotatable member at the center of said cover between said rods; and angularly turned inner ends on said rods pivotally connected with diametrically disposed points of said member, substantially as described.

2. The combination with a cooking utensil having an outwardly extending lip around its top, of a cover therefor; two substantially radiating rods slidably secured to said cover and provided at their outer ends with hooks adapted to engage said lip; a rotatable member at the center of said cover between said rods; and angularly turned inner ends on said rods pivotally connected with diametrically disposed points of said member, substantially as described.

In testimony whereof I have signed my name to this specification in the presence of two subscribing witnesses.

HERMAN A. PAQUETTE.

Witnesses:
JOSHUA R. H. POTTS,
B. G. RICHARDS.

Copies of this patent may be obtained for five cents each, by addressing the "Commissioner of Patents, Washington, D. C."